UNITED STATES PATENT OFFICE.

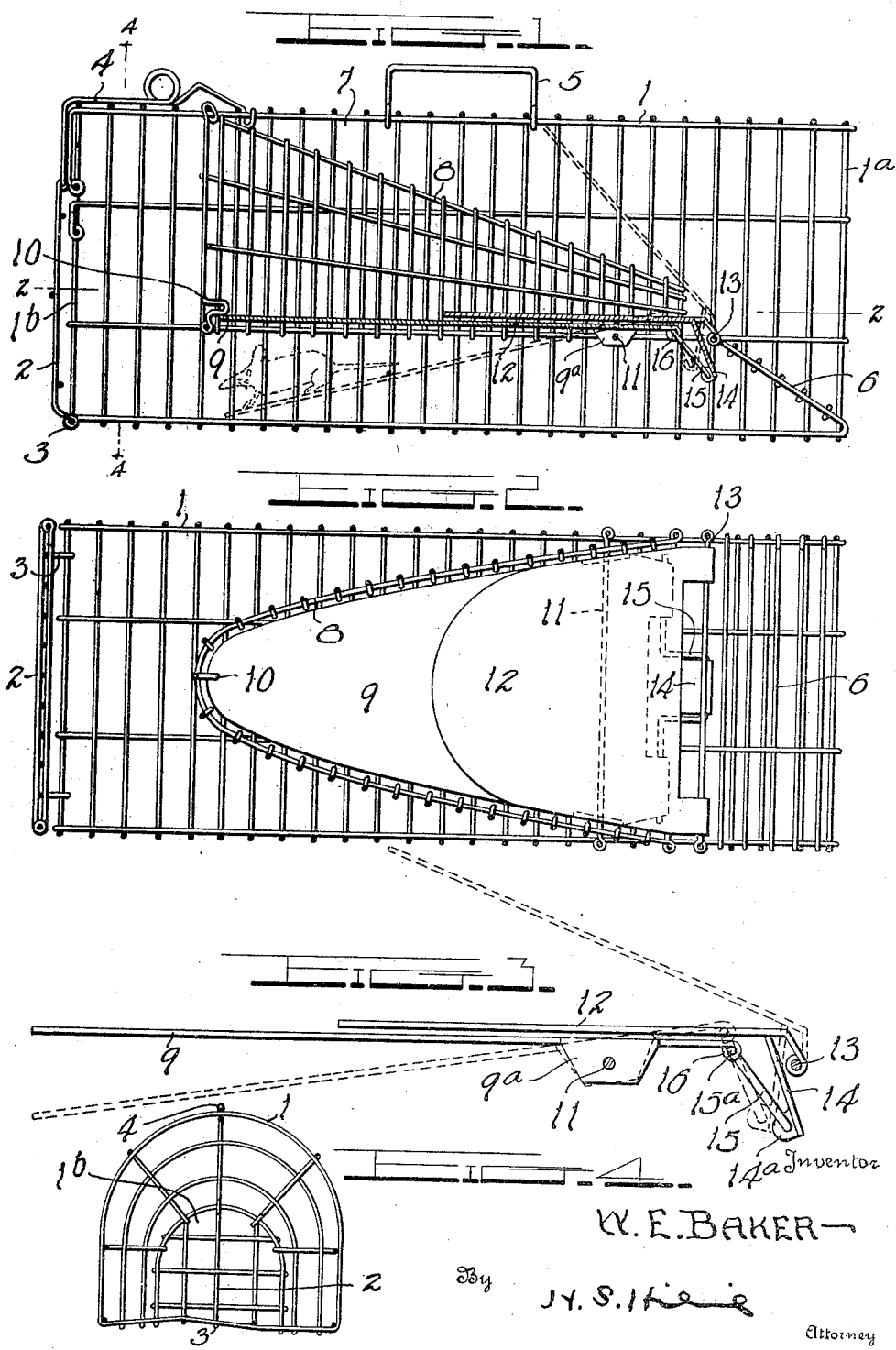

WILLIAM EDWARD BAKER, OF McCAULEY, TEXAS, ASSIGNOR OF ONE-HALF TO WILLIAM F. SONNEMAN, OF WACO, TEXAS.

ANIMAL-TRAP.

1,206,649. Specification of Letters Patent. Patented Nov. 28, 1916.

Application filed July 17, 1915. Serial No. 40,384.

*To all whom it may concern:*

Be it known that I, WILLIAM EDWARD BAKER, a citizen of the United States, residing at McCauley, in the county of Fisher and State of Texas, have invented certain new and useful Improvements in Animal-Traps, of which the following is a specification.

The present invention relates to certain new and useful improvements in animal traps, and has for its object to provide a self and ever set trap which embodies novel features of construction whereby it will operate in an effective manner to catch small animals to the limit of its capacity without danger of any of the animals escaping after once being caught.

Further objects of the invention are to provide a trap of this character which is comparatively simple and inexpensive in its construction, which provides a firm foothold for the animal until it is well within the trap and the trap door is ready to drop, which can be easily carried from place to place and set wherever desired, and which is so constructed that it is impossible for one animal to escape at the time another animal is caught.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a longitudinal sectional view through a trap constructed in accordance with the invention, the trap door being shown by full lines in a closed position and by dotted lines in an open position. Fig. 2 is a horizontal sectional view through the trap on the line 2—2 of Fig. 1. Fig. 3 is an enlarged detail view of the trap door mechanism, the doors being shown in normal position by full lines and in the position assumed when an animal is entering the trap by dotted lines. Fig. 4 is a transverse sectional view through the trap, taken on the line 4—4 of Fig. 1.

Corresponding and like parts are referred to in the following description and indicated in all the views of the drawing by the same reference characters.

Specifically describing the present embodiment of the invention, the numeral 1 designates the body portion of the trap which is in the form of an elongated cage and may be constructed of woven wire or wire mesh. One end of the cage is open at 1ª, while the opposite end thereof is formed with an opening 1ᵇ which is normally closed by a door 2, said door being hinged to the bottom of the cage as indicated at 3, and provided at its upper end with a suitable hook member 4 adapted to extend over the top of the cage and be brought into engagement with one of the bars of the wire mesh. This door 2 is normally closed and is merely opened for the purpose of removing captured animals from the interior of the cage or obtaining access thereto for some other purpose. The cage 1 is shown as having a uniform cross section and the top thereof may be transversely arched, while the bottom thereof is preferably flat so as to rest firmly upon a supporting surface. A suitable handle 5 is provided at the top of the cage for carrying the same from place to place.

Extending into the open end 1ª of the cage from the bottom thereof is an inclined runway 6 which may be formed of wire mesh or the like, and leads to a vestibule or ante-chamber 7 arranged within the upper portion of the cage 1. The inner end and sides of the ante-chamber 7 are formed by a vertical wall 8 of wire mesh which extends downwardly from the top of the cage 1. The upper end of the ante-chamber communicates with the open end 1ª of the cage 1 so that an animal may have free access thereto, while the bottom of the ante-chamber communicates with the interior of the cage 1 and is normally closed by a downwardly swinging trap door 9. The ante-chamber 7 tapers in width toward the inner end thereof, and the trap door 9 is correspondingly shaped so as to provide in effect a tilting bottom plate for the ante-chamber. A suitable stop 10 limits the upward swinging movement of the trap door 9 and prevents the same from being forced upwardly by an animal caught within the trap and attempting to escape.

At a point slightly spaced from the outer end thereof the swinging trap door 9 is pivotally mounted upon a transversely extending pivot rod 11, the sides of the trap door being provided with depending flanges 9ª through which the pivot rod extends. Projecting over the base or pivot end of the downwardly swinging trap door 9 is an upwardly swinging door 12, said upwardly swinging door 12 being pivoted at its outer end upon a transverse rod 13 and provided at its pivot end with a downwardly extending arm 14 which is connected by a link 15 to the outer end of the trap door 9. The door 12 projects over the trap door 9 for approximately one-half of the length of the latter and the weight thereof tends to swing it down into an open position and at the same time swing the trap door 9 upwardly into a closed position. The swinging end of the door 12 is shown as curved so as to conform to the shape of and fit against the transversely arched top of the cage 1 when the door is swung upwardly into a closed position, as indicated by dotted lines on Fig. 1. The link 15 may be conveniently formed from a single length of wire, and preferably has a U-shaped formation, the cross bar thereof being pivotally mounted within ears 14ª at the extremity of the arm 14, while the side bars thereof terminate in laterally bent arms 15 which are pivotally mounted within sleeves 16 formed by returning edge portions of the trap door 9. The two doors 9 and 12 are thus pivotally mounted and connected by the link 15 in such a manner as to swing in opposite directions, the door 12 swinging upwardly so as to close the entrance to the ante-chamber 7 at the same time that the trap door 9 swings downwardly to establish communication between the ante-chamber and the interior of the cage. The weight of the door 12 normally swings the same downwardly on top of the trap door 9 until the two contact with each other, the trap door 9 being then in a closed position. Any suitable form of bait may be used for attracting the animals, and when an animal first enters the ante-chamber 7, the weight thereof will be carried by the upwardly swinging trap door 12, and owing to the fact that this door 12 has already been swung downwardly to the limit of its movement, a steady footing or platform will be provided. As long as the weight of the animal is carried by the top of the door 12 there will be nothing unsteady or shaky to frighten the animal away, and it will proceed without hesitation to the inner end of the ante-chamber 7. However, as the weight of the animal is transferred from the top of the door 12 to the trap door 9, the latter will swing downwardly and deposit the animal in the bottom of the cage 1. At the same time that the trap door 9 swings downwardly to drop the animal into the cage, the door 12 will swing upwardly into engagement with the top of the cage so as to close the outer end of the ante-chamber 7 and thereby render it impossible for the animal to escape, even though it may take warning and attempt to run back up on the trap door 9 and leave the trap the same way it came in. The doors 9 and 12 are balanced so that the action thereof is very quick, and the simultaneous downward swinging movement of the trap door 9 with the upward swinging movement of the door 12 make it practically impossible for the animal to escape after it has once entered the ante-chamber 7 and transferred a sufficient amount of its weight from the door 12 to the trap door 9 to actuate the latter. The provision of the door 12 also renders it impossible for an animal previously caught within the trap to escape therefrom at the same time another animal enters the trap.

Having thus described the invention, what I claim as new and desire to secure by Letters Patent, is:—

1. An animal trap including a cage provided with a chamber having an entrance at one end thereof and communicating through the bottom thereof with the interior of the cage, a downwardly swinging horizontally disposed trap door normally closing the bottom of the chamber and pivoted at a point spaced from the outer end thereof to swing about a horizontal axis so that the outer end of the trap door swings upwardly as the inner end thereof swings downwardly to deposit an animal into the trap, an upwardly swinging door overhanging the outer end of the trap door and normally resting flatly upon the same, said upwardly swinging door extending beyond the horizontal axis of the trap door so as to provide a firm footing for the animal until he is well within the trap, and the outer end of the upwardly swinging door being pivoted to swing about a transverse axis parallel to the axis of the trap door and in the same horizontal plane therewith, an arm projecting downwardly from the pivot end of the upwardly swinging door, and a link pivotally connecting the arm and the outer end of the trap door for producing a simultaneous actuation of the two doors as soon as the weight of the animal is transferred from the upwardly swinging door to the trap door.

2. An animal trap including a cage provided with a chamber having an entrance at one end thereof and communicating through the bottom thereof with the interior of the cage, a downwardly swinging horizontal trap door normally closing the bottom of the chamber and pivotally mounted at a point spaced from the outer end thereof so that the outer end thereof swings upwardly when the inner end thereof swings downwardly to deposit an animal into the trap, an upwardly swinging door overhanging the outer end of the trap door and resting squarely thereon, said upwardly swinging door extending beyond the axis of the trap door so as to provide a firm footing for the animal until it is well within the trap, and said upwardly swinging trap door being pivotally mounted at its outer end to swing about a transverse axis parallel to the axis of the trap door and in the same horizontal plane therewith, a rigid arm projecting downwardly from the pivot end of the upwardly swinging door, and a U-shaped link member having the cross bar thereof pivotally connected to the end of the arm while the extremities of the side pieces thereof are pivotally connected to the outer end of the trap door so as to produce a simultaneous actuation of the two doors as soon as the weight of the animal is transferred from the upwardly swinging door to the trap door.

In testimony whereof I affix my signature in the presence of two witnesses.

WILLIAM EDWARD BAKER.

Witnesses:
FRANK HICKMAN,
WALTER L. ROGERS.

Copies of this patent may be obtained for five cents each, by addressing the "Commissioner of Patents, Washington, D. C."